United States Patent
Sung

(10) Patent No.: US 9,420,112 B2
(45) Date of Patent: Aug. 16, 2016

(54) DATA REDIRECTION SYSTEM AND METHOD USING INTERNET PROTOCOL PRIVATE BRANCH EXCHANGE

(75) Inventor: Jung-Sic Sung, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2583 days.

(21) Appl. No.: 11/700,062

(22) Filed: Jan. 31, 2007

(65) Prior Publication Data

US 2007/0189490 A1      Aug. 16, 2007

(30) Foreign Application Priority Data

Feb. 1, 2006    (KR) ................. 10-2006-0009861

(51) Int. Cl.
*H04M 7/00*      (2006.01)
*H04L 29/06*     (2006.01)
*H04M 3/42*      (2006.01)

(52) U.S. Cl.
CPC ......... *H04M 7/006* (2013.01); *H04L 29/06292* (2013.01); *H04M 3/42314* (2013.01); *H04M 7/009* (2013.01)

(58) Field of Classification Search
CPC ............... H04L 29/06027; H04L 65/1069; H04L 65/104; H04L 65/1043; H04L 65/1036; H04L 65/605; H04L 65/1026; H04L 69/08; H04L 12/66; H04L 29/12037; H04L 65/608; H04L 12/2836
USPC .................................................. 370/352–356
See application file for complete search history.

(56) References Cited

U.S. PATENT DOCUMENTS

| | | | |
|---|---|---|---|
| 7,428,234 B2 * | 9/2008 | Forte-McRobbie et al. | 370/352 |
| 2002/0112073 A1 * | 8/2002 | MeLampy et al. | 709/240 |
| 2002/0114282 A1 * | 8/2002 | MeLampy et al. | 370/238 |
| 2003/0033418 A1 * | 2/2003 | Young et al. | 709/230 |
| 2003/0093563 A1 * | 5/2003 | Young et al. | 709/245 |
| 2003/0154264 A1 * | 8/2003 | Martin et al. | 709/221 |
| 2003/0235177 A1 * | 12/2003 | Park | 370/338 |
| 2004/0028035 A1 * | 2/2004 | Read | H04L 29/06027 370/352 |
| 2004/0059942 A1 * | 3/2004 | Xie | 713/201 |
| 2004/0072593 A1 * | 4/2004 | Robbins et al. | 455/560 |
| 2004/0139230 A1 * | 7/2004 | Kim | 709/245 |

(Continued)

FOREIGN PATENT DOCUMENTS

| | | |
|---|---|---|
| GB | 2350014 | 11/2000 |
| JP | 10-145397 | 5/1998 |

(Continued)

OTHER PUBLICATIONS

The Decision of Grant from the Korean Intellectual Property Office issued in Applicant's corresponding Korean Patent Application No. 10-2006-0009861 dated Oct. 30, 2007.

(Continued)

*Primary Examiner* — Melanie Jagannathan
*Assistant Examiner* — Najeebuddin Ansari
(74) *Attorney, Agent, or Firm* — H.C. Park & Associates, PLC

(57) ABSTRACT

A multimedia redirection system and method using an IP PBX are provided. The PBX system allocates at least one channel for multimedia data transmission between a private IP terminal and a public IP terminal, maps between ports of the channels, and direction-transmits the multimedia data between the private IP terminal and the public IP terminal.

18 Claims, 3 Drawing Sheets

(56) References Cited

U.S. PATENT DOCUMENTS

| | | | |
|---|---|---|---|
| 2004/0205209 A1 | 10/2004 | Wengrovitz et al. | |
| 2005/0021798 A1* | 1/2005 | Forte-McRobbie et al. | 709/230 |
| 2005/0135376 A1* | 6/2005 | Bae et al. | 370/395.2 |
| 2005/0141482 A1* | 6/2005 | Kleiner | 370/352 |
| 2005/0201304 A1* | 9/2005 | Olshansky | 370/282 |
| 2005/0210292 A1* | 9/2005 | Adams et al. | 713/201 |
| 2005/0254482 A1* | 11/2005 | Yeom | 370/352 |
| 2006/0013211 A1* | 1/2006 | Deerman et al. | 370/389 |
| 2006/0018308 A1* | 1/2006 | Choi et al. | 370/352 |
| 2006/0062225 A1* | 3/2006 | Li | 370/396 |
| 2006/0098577 A1* | 5/2006 | MeLampy et al. | 370/238 |
| 2006/0140174 A1* | 6/2006 | Yeom | 370/352 |
| 2006/0146859 A1* | 7/2006 | Baldwin et al. | 370/438 |
| 2006/0187900 A1* | 8/2006 | Akbar | H04M 7/0066 370/352 |
| 2006/0256774 A1* | 11/2006 | Rigaldies et al. | 370/352 |
| 2006/0262915 A1* | 11/2006 | Marascio et al. | 379/201.01 |
| 2006/0268826 A1* | 11/2006 | Son | 370/352 |
| 2007/0041373 A1* | 2/2007 | Lor | H04L 29/06027 370/356 |

FOREIGN PATENT DOCUMENTS

| | | |
|---|---|---|
| KR | 10-2004-0110032 | 12/2004 |
| KR | 10-2005-0078325 | 8/2005 |
| KR | 10-2005-0042581 | 3/2006 |
| KR | 10-2006-0076544 | 7/2006 |

OTHER PUBLICATIONS

Korean Office Action corresponding to Korean Patent Application No. 2006-0009861, issued on Apr. 27, 2007.
European Search Report corresponding to European Patent Application No. 07002087.0-1237, issued on Jul. 9, 2007.
K. Egevang, et al, "Request for Comments: 1631 The IP Network Address Translator", Network Working Group, May 1994, pp. 1-10.

* cited by examiner

FIG. 2

| MGI CHANNEL | TELEPHONE NO. | VIDEO PHONE IP ADDRESS | VIDEO PHONE VOICE PORT (RTP) | VIDEO PHONE VIDEO PORT (RTP) | MGI VOICE PORT (RTP) | MGI VIDEO PORT (RTP) |
|---|---|---|---|---|---|---|
| 0 | 3200 | 20.20.20.20 | 9000 | 9002 | 30000 | 30002 |
| 1 | 3100 | 201.111.200.40 | 7600 | 7700 | 30004 | 30006 |
| 2 | | | | | | |
| 3 | | | | | | |
| ... | ... | ... | ... | ... | ... | |

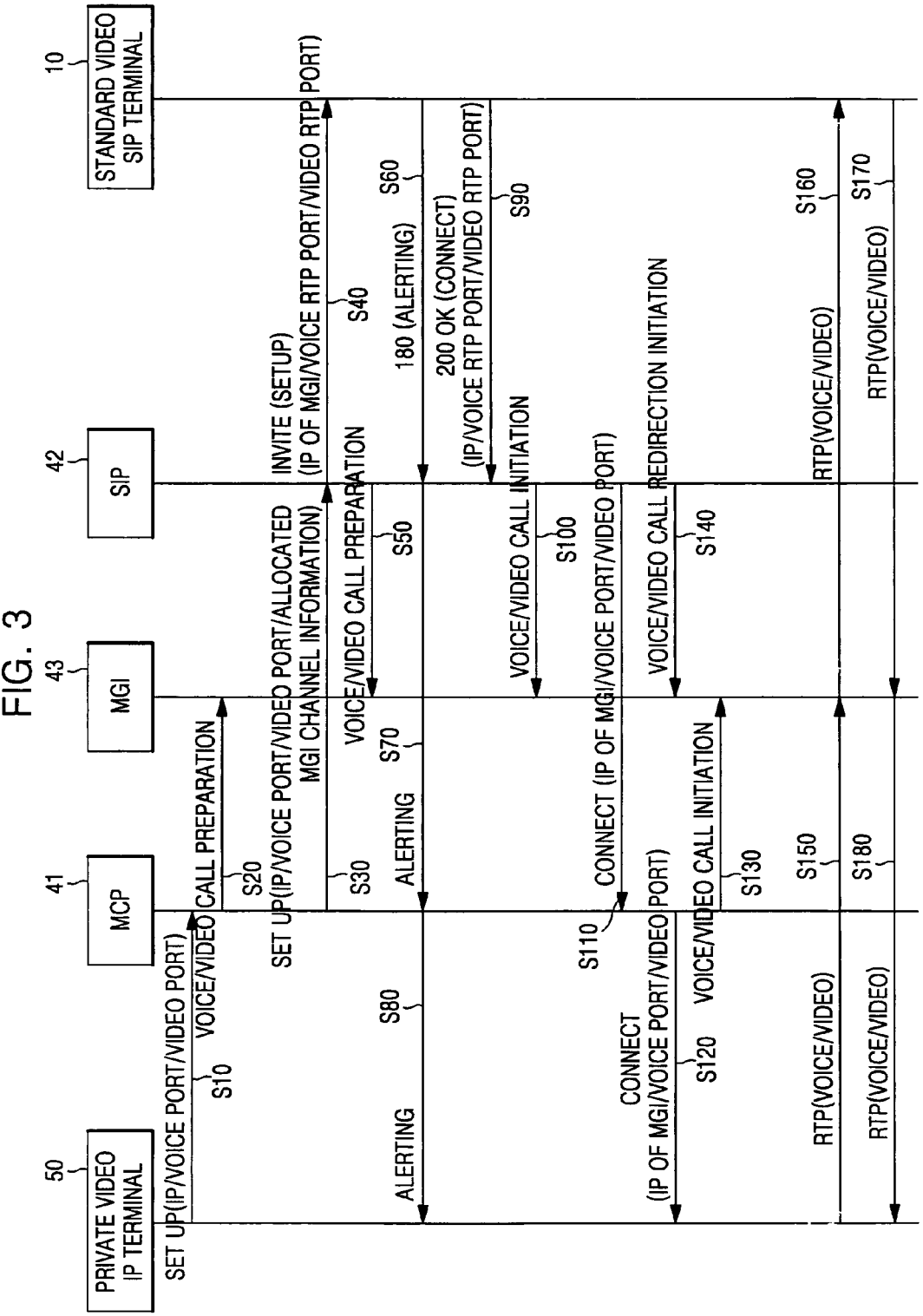

DATA REDIRECTION SYSTEM AND METHOD USING INTERNET PROTOCOL PRIVATE BRANCH EXCHANGE

CLAIM OF PRIORITY

This application makes reference to, incorporates the same herein, and claims all benefits accruing under 35 U.S.C. §119 from an application for REDIRECTION TRANSPORT SYSTEM AND METHOD IN INTERNET PROTOCOL PRIVATE BRANCH EXCHANGE earlier filed in the Korean Intellectual Property Office on 1 Feb. 2006 and there duly assigned Serial No. 10-2006-0009861.

BACKGROUND OF THE INVENTION

1. Field of the Invention

The present invention relates to a data redirection system and method using an Internet protocol private branch exchange (IP PBX).

2. Description of the Related Art

In much of the Internet, public IP addresses are generally limited in number, and thus need to be shared. A network address translator (NAT) enables a number of users to share public IP addresses by translating public IP address to private IP address and vice versa.

A firewall should be disposed between the Internet and a private network to protect a user's network from external attacks. When the network address translator (NAT) is disposed in a router providing a connection to the Internet, a public IP address allocated to the router is externally known and only a private IP address is used in the router. The router translates the public IP address to the private IP addresses and vice versa. A hacker needs to be aware of the private IP address in order to attack the private network, and thus the private network can be safely protected, because it is difficult for the hacker to know the private IP address.

For example, in case of a voice call, the private IP address of a media gateway interface (MGI) is first mapped in a one-to-one correspondence to the public IP address of the router to pass through the network address translator (NAT), a voice data packet received from an internal or external IP terminal is converted to a pulse code modulation (PCM) voice data, the PCM voice data is converted to a voice data packet by the a time division multiplexing (TDM) switching module, and the voice data packet is then transmitted to the other party's IP terminal.

Particularly, in converting the voice data packet to the PCM voice data, a media gateway interface (MGI) channel of the media gateway interface (MGI) is used, and 2 channels are used for each of an outgoing call and an incoming call. Two sessions are established and generated between the internal IP terminal and the external IP terminal. One is established between the internal IP terminal and the media gateway interface (MGI), and the other is established between the media gateway interface (MGI) and the external IP terminal.

As described above, the video IP terminal of a conventional IP PBX system converts the voice data packet to the PCM voice data and then converts the PCM voice data to the voice data packet again in transmitting and receiving the voice data through the media processor after establishing a VoIP call through a signal processor of the IP PBX system. The twice conversion significantly degrades a voice quality.

In addition, there is no solution of call service between a standard video session initiation protocol (SIP) terminal and an internal video IP terminal of the IP PBX system in a network address translation environment.

SUMMARY OF THE INVENTION

It is an objective of the present invention to provide a data redirection system and method in which the voice/video data packets are transmitted between the video IP terminal of the IP PBX which supports the voice/video services and the external standard video session initiation protocol (SIP) terminal via the media gateway interface (MGI), and the voice/video data received from the video IP terminal are Real-time Transport Protocol (RTP)-redirected at the media gateway interface (MGI) to be directly transceived without conversion, thereby preventing the voice data delay problem and the voice quality degradation problem caused from using the network address translator (NAT).

One aspect of the present invention provides a private branch exchange (PBX) system, comprising: a PBX for allocating at least one channel for multimedia data transmission between a private IP terminal and a public IP terminal, mapping between ports of the channels, and redirecting the multimedia data between the private IP terminal and the public IP terminal according to the mapped port.

The PBX may further comprise a first channel allocation module for allocating a first Real-time Transport Protocol (RTP) port of a first media gateway interface (MGI) channel according to a call setup message received from the private IP terminal; a second channel allocation module for allocating a second Real-time Transport Protocol (RTP) port of a second media gateway interface (MGI) channel according to the call setup message having the first allocated Real-time Transport Protocol (RTP) port; and a redirection module for mapping between the first and second Real-time Transport Protocol (RTP) ports to redirect the multimedia data between the private IP terminal and the public IP terminal according to a call connect message received from the public IP terminal.

The call setup message received from the private IP terminal may comprise at least one of information on an IP address, a voice port, and a video port of the private IP terminal.

Information about the first allocated Real-time Transport Protocol (RTP) port may comprise at least one of voice/video ports of the private IP terminal and voice/video ports of the first media gateway interface (MGI) channel, and information about the second allocated Real-time Transport Protocol (RTP) port may comprise at least one of voice/video ports of the public IP terminal and voice/video ports of the second media gateway interface (MGI) channel.

The redirection module may receive voice data received from the voice port of the private IP terminal via the voice port of the first media gateway interface (MGI) channel and redirects the voice data to the voice port of the public IP terminal.

The redirection module may receive video data received from the video port of the private IP terminal via the video port of the first media gateway interface (MGI) channel and redirects the video data to the video port of the public IP terminal.

The redirection module may receive voice data received from the voice port of the public IP terminal via the voice port of the second media gateway interface (MGI) channel and redirects the voice data to the voice port of the private IP terminal.

The redirection module may receive video data received from the video port of the public IP terminal via the video port of the second media gateway interface (MGI) channel and redirects the video data to the video port of the private IP terminal.

Another aspect of the present invention provides a private branch exchange (PBX), comprising: a first channel allocation module for allocating a first Real-time Transport Protocol (RTP) port of a first media gateway interface (MGI) channel according to a call setup message received from a private IP terminal; a second channel allocation module for allocating a second Real-time Transport Protocol (RTP) port of a second media gateway interface (MGI) channel according to the call setup message having the first allocated Real-time Transport Protocol (RTP) port; and a redirection module for mapping between the first and second Real-time Transport Protocol (RTP) ports to redirect the multimedia data between the private IP terminal and a public IP terminal according to a call connect message received from the public IP terminal.

Yet another aspect of the present invention provides a multimedia redirection method, comprising the steps of: allocating a first Real-time Transport Protocol (RTP) port of a first media gateway interface (MGI) channel according to a call setup message received from a private IP terminal to store first Real-time Transport Protocol (RTP) port information; allocating a second Real-time Transport Protocol (RTP) port of a second media gateway interface (MGI) channel according to the call setup message having the first allocated Real-time Transport Protocol (RTP) port to store second Real-time Transport Protocol (RTP) information; and mapping between the first and second Real-time Transport Protocol (RTP) ports to redirect the multimedia data between the private IP terminal and a public IP terminal according to a call connect message received from the public IP terminal.

The call setup message received from the private IP terminal may comprise at least one of information on an IP address, a voice port, and a video port of the private IP terminal.

Information about the first allocated Real-time Transport Protocol (RTP) port may comprise at least one of voice/video ports of the private IP terminal and voice/video ports of the first media gateway interface (MGI) channel, and information about the second allocated Real-time Transport Protocol (RTP) port may comprise at least one of voice/video ports of the public IP terminal and voice/video ports of the second media gateway interface (MGI) channel.

The redirecting step may comprise the step of receiving voice data from the voice port of the private IP terminal via the voice port of the first media gateway interface (MGI) channel and redirecting the voice data to the voice port of the public IP terminal.

The redirecting step may comprise the step of receiving video data from the video port of the private IP terminal via the video port of the first media gateway interface (MGI) channel and redirecting the video data to the video port of the public IP terminal.

The redirecting step may comprise the step of receiving voice data from the voice port of the public IP terminal via the voice port of the second media gateway interface (MGI) channel and redirecting the voice data to the voice port of the private IP terminal.

The redirecting step may comprise the step of receiving video data from the video port of the public IP terminal via the video port of the second media gateway interface (MGI) channel and redirecting the video data to the video port of the private IP terminal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2 illustrates an example of media gateway interface (MGI) channel information according to an exemplary embodiment of the present invention; and FIG. 3 is a flowchart illustrating a procedure for setting up a call from a video IP terminal of an IP PBX to a standard video session initiation protocol (SIP) terminal according to an exemplary embodiment of the present invention.

DETAILED DESCRIPTION OF EXEMPLARY EMBODIMENTS

Figure 1:
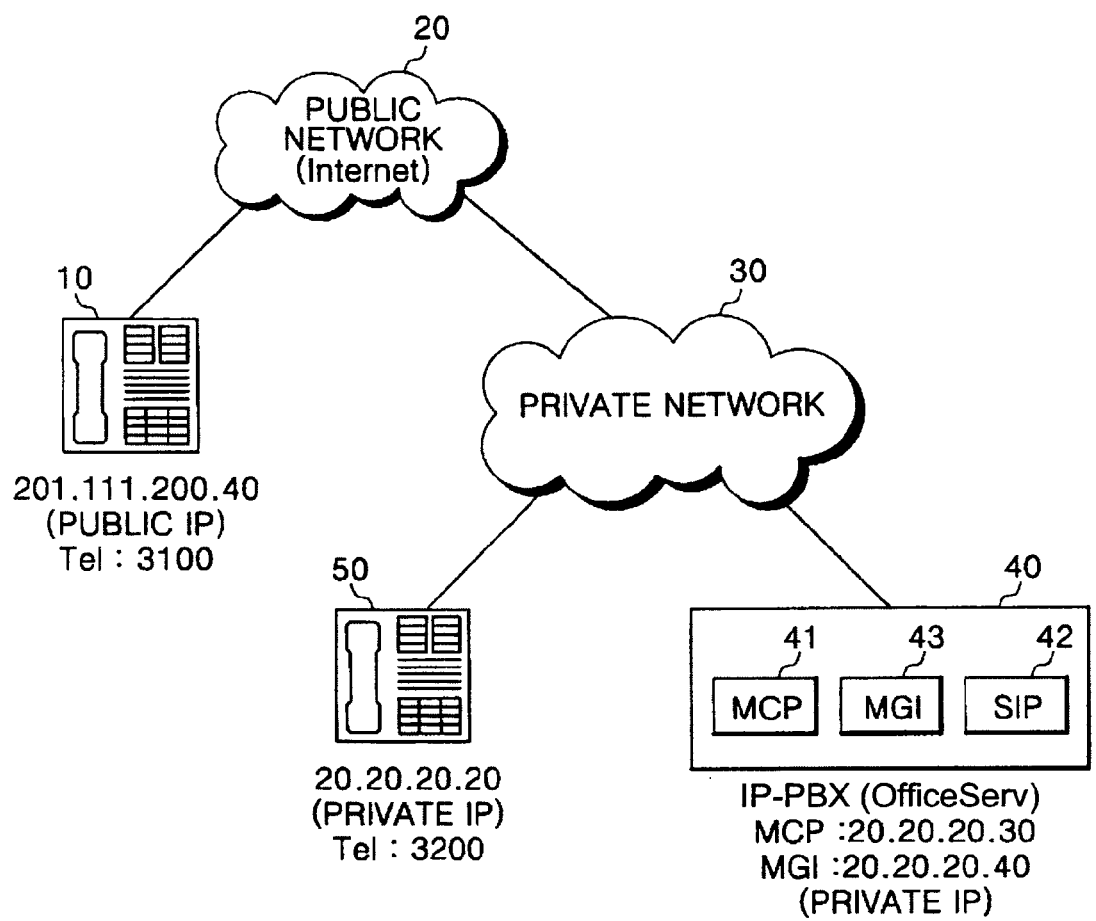
FIG. 1 illustrates a system for redirecting voice/video data using an IP PBX according to an exemplary embodiment of the present invention.

Hereinafter, exemplary embodiments of the present invention will be described in detail with reference to the accompanying drawings. In the following description, a detailed description of known functions and configurations incorporated herein has been omitted for conciseness.

FIG. 1 illustrates a system for redirecting voice/video data using an Internet protocol private branch exchange (IP PBX) according to an exemplary embodiment of the present invention, and FIG. 2 illustrates an example of media gateway interface (MGI) channel information according to an exemplary embodiment of the present invention.

As shown in FIG. 1, the data redirection system comprises a standard video session initiation protocol (SIP) terminal 10, a public network (e.g., Internet) 20, a private network 30, an IP PBX (OfficeServ) 40, and a video IP terminal 50.

The standard video session initiation protocol (SIP) terminal 10 receives/transmits voice/video data from/to the video IP terminal 50 under control of the IP PBX 40 using a SIP protocol via the public network 20.

A network address translator (NAT) (not shown) is disposed in the private network 30, and the network address translator (NAT) maps private IP addresses allocated to a plurality of IP terminals in the private network to one public IP address allocated from an Internet service provider (ISP), and converts external IP traffics to the private IP traffics and transmits the private IP traffics to the inside of the private network 30.

The IP PBX 40 is disposed in the private network 30 and comprises a main control process (MCP) 41, a standard session initiation protocol (SIP) module 42 and a media gateway interface (MGI) 43.

The main control process (MCP) 41 plays a role of a main controller of the IP PBX 40, and performs all signaling processes of the IP PBX 40. The main control process (MCP) 41 may comprise the standard session initiation protocol (SIP) module 42. The standard session initiation protocol (SIP) module 42 functions to receive/transmit the voice/video data from/to the standard session initiation protocol (SIP) terminal 10 using the SIP protocol.

The main control process (MCP) 41 allocates a channel of the media gateway interface (MGI) 43 when a call setup message is received from the video IP terminal 50. That is, the main control process (MCP) 41 allocates voice and video real-time transport protocol (RTP) ports of the media gateway interface (MGI) 43 and transmits a voice/video call preparation message to the media gateway interface (MGI) 43.

The main control process (MCP) 41 transmits a call setup message of the video IP terminal 50 to the standard session initiation protocol (SIP) module 42 after allocating the channel of the media gateway interface (MGI) 43. The call setup message comprises information about an IP address, a voice Real-time Transport Protocol (RTP) port, a video Real-time Transport Protocol (RTP) port, and an allocated media gateway interface (MGI) channel of the video IP terminal 50.

The main control process (MCP) 41 transmits a voice/video call initiation message to the media gateway interface (MGI) 43 to exchange the voice/video data between the video IP terminal 50 and the media gateway interface (MGI) 43.

The media gateway interface (MGI) 43 converts voice packet data received from the video IP terminal 50 connected to an Ethernet switch to PCM voice data, and compresses and packetizes the PCM voice data and then transmits the PCM voice data packet.

When the voice/video call preparation message is received from the main control process (MCP) 41, the media gateway interface (MGI) 43 stores data like an media gateway interface (MGI) channel 0 as shown in FIG. 2 and is ready to receive/transmit the voice/video data from/to the video IP terminal 50 using the stored Real-time Transport Protocol (RTP) protocol.

When the voice/video call initiation message is received from the standard session initiation protocol (SIP) module 42, the media gateway interface (MGI) 43 stores the information about the IP address, the voice Real-time Transport Protocol (RTP) port, and the video Real-time Transport Protocol (RTP) port which are included in the voice/video call initiation message in an media gateway interface (MGI) channel 1 and starts to transmit and receive the Real-time Transport Protocol (RTP) data.

In particular, when a voice/video call redirection message is received from the standard session initiation protocol (SIP) module 42, the media gateway interface (MGI) 43 transmits and receives the video/voice Real-time Transport Protocol (RTP) data of the media gateway interface (MGI) channels 0 and 1 of FIG. 2 in a cross fashion.

In other words, the media gateway interface (MGI) 43 receives the voice data from the video IP terminal 50 (Channel #0) via the media gateway interface (MGI) voice port 30000 and retransmits the voice data to the voice port 7600 of the standard video session initiation protocol (SIP) terminal 10 (Channel #1) without performing a separate conversion process. The media gateway interface (MGI) 43 receives the video data via the media gateway interface (MGI) video port 30002 and retransmits the video data to the video port 7700 of the standard video session initiation protocol (SIP) terminal 10.

The media gateway interface (MGI) 43 receives the voice data from the standard video session initiation protocol (SIP) terminal 10 (Channel #1) via the media gateway interface (MGI) voice port 30004 and retransmits the voice data to the voice port 9000 of the video IP terminal 50 without performing a separate conversion process, and the media gateway interface (MGI) 43 receives the video data via the media gateway interface (MGI) video port 30006 and retransmits the video data to the video port 9002 of the video IP terminal 50.

The standard session initiation protocol (SIP) module 42 receives the call setup message from the main control process (MCP) 41 to allocate the media gateway interface (MGI) channel 1, composes an invite (Setup) message using the voice/video Real-time Transport Protocol (RTP) ports of the allocated media gateway interface (MGI) channel 1 and the public IP address (201.111.199.40) of the main control process (MCP) 41 and the media gateway interface (MGI) 43, transmits the invite (Setup) message to the standard video session initiation protocol (SIP) terminal 10, and transmits the voice/video call preparation message to the media gateway interface (MGI).

The standard session initiation protocol (SIP) module 42 receives a "200 OK (Connect)" message when a user of the standard video session initiation protocol (SIP) terminal 10 picks up a receiver, and transmits the voice/video call initiation message having the IP address and the voice/video Real-time Transport Protocol (RTP) ports of the standard video session initiation protocol (SIP) terminal 10 to the media gateway interface (MGI) 43.

The standard session initiation protocol (SIP) module 42 transmits the connect message to the main control process (MCP) 41, and the main control process (MCP) 41 inserts the IP address, the voice Real-time Transport Protocol (RTP) port and the video Real-time Transport Protocol (RTP) port which are allocated in the media gateway interface (MGI) channel 0 into the connect message and transmits it to the video IP terminal 50.

The standard session initiation protocol (SIP) module 42 transmits the voice/video call redirection message to the media gateway interface (MGI) 43. The voice/video call redirection message comprises two media gateway interface (MGI) channel information: media gateway interface (MGI) channel allocated in "0"-MCP; and media gateway interface (MGI) channel allocated in "1"-SIP.

The video IP terminal 50 is an IP terminal for performing a voice/video call with the standard video session initiation protocol (SIP) terminal 10 under control of the IP PBX 40 in the private network, and transmits the call setup message to the main control process (MCP) 41 of the IP PBX 40.

FIG. 3 is a flowchart illustrating a procedure for setting up a call from the video IP terminal of the IP PBX (OfficeServ) 40 to the standard video session initiation protocol (SIP) terminal 10 according to the exemplary embodiment of the present invention.

As shown in FIG. 3, the video IP terminal 50 transmits a call setup message to the main control process (MCP) 41 of the IP PBX 40 (S10). The call setup message comprises information about the IP address, the voice Real-time Transport Protocol (RTP) port and the video Real-time Transport Protocol (RTP) port of the video IP terminal 50.

The main control process (MCP) 41 of the IP PBX 40 receives the call setup message from the video IP terminal 50 and allocates a channel of the media gateway interface (MGI) 43. That is, as the allocated channel, the voice Real-time Transport Protocol (RTP) port and the video Real-time Transport Protocol (RTP) port of the media gateway interface (MGI) 43 are allocated.

The main control process (MCP) 41 transmits the voice/video call preparation message to the media gateway interface (MGI) 43 (S20).

The media gateway interface (MGI) 43 receives the voice/video call preparation message from the main control process (MCP) 41, stores the data like the media gateway interface (MGI) channel 0 as shown in FIG. 2 and is ready to exchange the voice/video data between the media gateway interface (MGI) 43 and the video IP terminal 50 using the stored Real-time Transport Protocol (RTP) port. The data stored in the media gateway interface (MGI) channel 0 includes a telephone number (3200) of the video IP terminal 50, a private video phone IP address (20.20.20.20), a private video phone voice port (RTP) (9000), a private video phone video port (RTP) (9002), an media gateway interface (MGI) voice port (RTP) (30000), and an media gateway interface (MGI) video port (RTP) (30002).

That is, information about the transmitting IP address and Real-time Transport Protocol (RTP) port and the receiving IP address and Real-time Transport Protocol (RTP) port is known at a side of the media gateway interface (MGI) channel 0 of the media gateway interface (MGI) 43, but the video IP terminal 50 does not know information about the IP address and Real-time Transport Protocol (RTP) port for transmitting data to the media gateway interface (MGI) 43.

When the corresponding data is stored in the media gateway interface (MGI) channel 0, the main control process (MCP) 41 transmits the call setup message of the video IP terminal 50 to the standard session initiation protocol (SIP) module 42 (S30). The call setup message comprises information about the IP address, the voice Real-time Transport Protocol (RTP) port, the video Real-time Transport Protocol (RTP) port, and the allocated media gateway interface (MGI) channel of the video IP terminal 50.

The standard session initiation protocol (SIP) module 42 which receives the call setup message from the main control process (MCP) 41 allocates the media gateway interface (MGI) channel 1 as shown in FIG. 2, composes the invite message (Setup) using the voice/video Real-time Transport Protocol (RTP) ports of the media gateway interface (MGI) channel 1 and the public IP address (201.111.199.40) of the main control process (MCP) 41 and the media gateway interface (MGI) 43, and transmits the invite message (setup) to the standard video session initiation protocol (SIP) terminal 10 (S40). The invite message (setup) comprises information about the IP address, the voice Real-time Transport Protocol (RTP) port and the video Real-time Transport Protocol (RTP) port of the media gateway interface (MGI) 43.

The standard session initiation protocol (SIP) module 42 transmits the voice/video call preparation message to the media gateway interface (MGI) 43 (S50).

Upon receipt of the voice/video call preparation message from the standard session initiation protocol (SIP) module 42, the media gateway interface (MGI) 43 stores information of the media gateway interface (MGI) channel 1 as shown in FIG. 1, and is ready to exchange the voice/video data between the media gateway interface (MGI) 43 and the video IP terminal 50 using the Real-time Transport Protocol (RTP) port.

Upon receipt of the invite message (setup) from standard session initiation protocol (SIP) module 42, the standard video session initiation protocol (SIP) terminal 10 transmits a "180 (Alerting)" message to the standard session initiation protocol (SIP) module 42 (S60).

The standard session initiation protocol (SIP) module 42 transmits the "180 (Alerting)" message to the main control process (MCP) 41 (S70), and the main control process (MCP) 41 transmits the "180 (Alerting)" message to the video IP terminal 50 (S80).

Accordingly, the standard session initiation protocol (SIP) terminal 10 becomes in a ringing state, and the video IP terminal 50 becomes in a state for hearing a virtual ring back tone.

When a user of the standard video session initiation protocol (SIP) terminal 10 hears a ring signal to pick up the receiver, the "200 OK (connect)" message is transmitted to the standard session initiation protocol (SIP) module 42 (S90). The "200 OK (connect)" message comprises the IP address and the voice/video Real-time Transport Protocol (RTP) ports of the standard video session initiation protocol (SIP) terminal 10.

The standard session initiation protocol (SIP) module 42 transmits the voice/video call initiation message having the IP address and the voice/video Real-time Transport Protocol (RTP) ports of the standard video session initiation protocol (SIP) terminal 10 to the media gateway interface (MGI) 43 (S100).

The media gateway interface (MGI) 43 stores information about the IP address, the voice Real-time Transport Protocol (RTP) port and the video Real-time Transport Protocol (RTP) port which are included in the voice/video call initiation message received from the standard session initiation protocol (SIP) module 42 in the media gateway interface (MGI) channel 1 as shown in FIG. 2 and starts to transmit and receive the Real-time Transport Protocol (RTP) data. At this time, there is no transmitted video data, and received data are discarded until a specific instruction is given. In this state, the media gateway interface (MGI) 43 and the standard video session initiation protocol (SIP) terminal 10 exchange the voice and video data.

The standard session initiation protocol (SIP) module 42 transmits the connect message to the main control process (MCP) 41 (S110). The connect message comprises information about the IP address, the voice Real-time Transport Protocol (RTP) port and the video Real-time Transport Protocol (RTP) port of the media gateway interface (MGI) 43.

The main control process (MCP) 41 inserts the IP address, the voice Real-time Transport Protocol (RTP) port and the video Real-time Transport Protocol (RTP) port of the media gateway interface (MGI) allocated in the media gateway interface (MGI) channel 0 into the connect message and transmits it to the video IP terminal 50 (S120).

Accordingly, the video IP terminal 50 can transmit the voice/video data, and thus can exchange the voice/video data with the media gateway interface (MGI) 43.

The main control process (MCP) 41 transmits the voice/video call initiation message to the media gateway interface (MGI) 43 (S130), and thus the video IP terminal 50 and the media gateway interface (MGI) 43 exchanges the voice and video data. Of course, the media gateway interface (MGI) 43 discards the video data until a specific instruction is given.

The standard session initiation protocol (SIP) module 42 transmits the voice/video call redirection message to the media gateway interface (MGI) 43 (S140). The voice/video call redirection message comprises two important information on the media gateway interface (MGI) channel: media gateway interface (MGI) channel allocated in "0"-MCP; and media gateway interface (MGI) channel is allocated in "1"-SIP.

After receiving the voice/video call redirection message from the standard session initiation protocol (SIP) module 42, the media gateway interface (MGI) 43 starts to transmit and receive the voice/video Real-time Transport Protocol (RTP) data of the media gateway interface (MGI) channel and media gateway interface (MGI) channel 1 in a cross fashion.

In other words, the media gateway interface (MGI) 43 receives the voice data from the video IP terminal 50 (Channel #0) via the media gateway interface (MGI) voice port 30000 and retransmits the voice data to the voice port 7600 of the standard video session initiation protocol (SIP) terminal 10 (Channel #1) without performing a separate conversion process (S150). The media gateway interface (MGI) 43 receives the video data via the media gateway interface (MGI) port 30002 and retransmits the video data to the video port 7700 of the standard video session initiation protocol (SIP) terminal 10 (S160).

The media gateway interface (MGI) 43 receives the voice data from the standard video session initiation protocol (SIP) terminal 10 (Channel #1) via the media gateway interface (MGI) voice port 30004 and retransmits the voice data to the voice port 9000 of the video IP terminal 50 without performing a separate conversion process (S170), and the media gateway interface (MGI) 143 receives the video data via the media gateway interface (MGI) video port 30006 and retransmits the video data to the video port 9002 of the video IP terminal 50 (S180).

Accordingly, the voice/video Real-time Transport Protocol (RTP) data (RTP voice/video) are exchanged between the video IP terminal 50 and the standard video session initiation protocol (SIP) terminal 10 through the media gateway interface (MGI) 43.

As described above, according to the present invention, the voice/video IP PBX is provided with the voice Real-time Transport Protocol (RTP) redirection function to thereby resolve the problems of the existing network address translator (NAT) and eliminate a need for conversion between the voice data packet and the PCM voice data. Accordingly, the voice quality is guaranteed, and the video service can be provided without using separate equipment even in the network employing the network address translator (NAT).

While the present invention has been described with reference to exemplary embodiments thereof, it will be understood by those skilled in the art that various changes in from and detail may be made therein without departing from the scope of the present invention as defined by the following claims.

What is claimed is:

1. A private branch exchange (PBX) system, comprising:
a private branch exchange comprising at least one processor configured to:
allocate at least one channel for multimedia data transmission between a private Internet Protocol (IP) terminal and a public IP terminal having a public IP address;
map between ports of the at least one channel; and
redirect the multimedia data, without conversion to pulse-code modulated data, between the private IP terminal and the public IP terminal, according to the mapped ports,
wherein the private branch exchange comprises:
a first channel allocation module configured to allocate a first Real-time Transport Protocol (RTP) port of a first media gateway interface (MGI) channel, according to a first call setup message received from the private IP terminal;
a second channel allocation module configured to allocate a second RTP port of a second MGI channel, according to a second call setup message having the first allocated RTP port; and
a redirection module configured to map between the first RTP port and the second RTP port and to redirect the multimedia data between the private IP terminal and the public IP terminal, according to a call connect message received from the public IP terminal, and
wherein the first call setup message received from the private IP terminal comprises information about at least one of an IP address of the private IP terminal and the first RTP port.

2. The PBX system of claim 1, wherein the information about the first RTP port comprises information about at least one of a voice port and/or a video port of the private IP terminal and a voice port and/or a video port of the first MGI channel, and information about the second RTP port comprises information about at least one of a voice port and/or a video port of the public IP terminal and a voice port and/or a video port of the second MGI channel.

3. The PBX system of claim 2, wherein the redirection module is further configured to receive voice data from the voice port of the private IP terminal, via the voice port of the first MGI channel, and redirect the voice data to the voice port of the public IP terminal without conversion.

4. The PBX system of claim 2, wherein the redirection module is further configured to receive video data from the video port of the private IP terminal, via the video port of the first MGI channel, and redirect the video data to the video port of the public IP terminal without conversion.

5. The PBX system of claim 2, wherein the redirection module is further configured to receive voice data from the voice port of the public IP terminal, via the voice port of the second MGI channel, and redirect the voice data to the voice port of the private IP terminal without conversion.

6. The PBX system of claim 2, wherein the redirection module is further configured to receive video data from the video port of the public IP terminal, via the video port of the second MGI channel, and redirect the video data to the video port of the private IP terminal without conversion.

7. A private branch exchange (PBX), comprising:
at least one processor; and
at least one memory comprising one or more sequences of one or more instructions that, when executed by the at least one processor, cause the private branch exchange at least to:
allocate at least one channel for multimedia data transmission between a private Internet Protocol (IP) terminal and a public IP terminal having a public IP address, wherein the allocation comprises:
allocation of a first media gateway interface (MGI) channel and a first Real-time Transport Protocol (RTP) port of the first MGI channel, according to a first call setup message received from the private IP terminal; and
allocation of a second MGI channel and a second RTP port of the second MGI channel, according to a second call setup message having the first allocated RTP port;
map between ports of the at least one channel; and
redirect the multimedia data, without conversion to pulse-code modulated data, between the private IP terminal and the public IP terminal, according to the mapped ports, wherein the mapping and the redirection comprises:
mapping between the first RTP port and the second RTP port to redirect the multimedia data, without conversion to pulse-code modulated data, between the private IP terminal and the public IP terminal having the public IP address, according to a call connect message received from the public IP terminal,
wherein the first call setup message comprises information about at least one of an IP address of the private IP terminal and the first RTP port.

8. The PBX of claim 7, wherein the information about the first RTP port comprises information about at least one of a voice port and/or a video port of the private IP terminal and a voice port and/or a video port of the first MGI channel, and information about the second RTP port comprises information about at least one of a voice port and/or a video port of the public IP terminal and a voice port and/or a video port of the second MGI channel.

9. The PBX of claim 8, wherein the redirection module is further configured to receive voice data from the voice port of the private IP terminal, via the voice port of the first MGI channel, and redirect the voice data to the voice port of the public IP terminal without conversion.

10. The PBX of claim 8, wherein the redirection module is further configured to receive video data from the video port of the private IP terminal, via the video port of the first MGI channel, and redirect the video data to the video port of the public IP terminal without conversion.

11. The PBX of claim 8, wherein the redirection module is further configured to receive voice data from the voice port of the public IP terminal, via the voice port of the second MGI channel, and redirect the voice data to the voice port of the private IP terminal without conversion.

12. The PBX of claim 8, wherein the redirection module is further configured to receive video data from the video port of the public IP terminal, via the video port of the second MGI channel, and redirect the video data to the video port of the private IP terminal without conversion.

13. A multimedia redirection method, comprising:
    allocating at least one channel for multimedia data transmission between a private Internet Protocol (IP) terminal and a public IP terminal having a public IP address, wherein the allocating comprises:
        allocating a first media gateway interface (MGI) channel and a first Real-time Transport Protocol (RTP) port of the first MGI channel, according to a first call setup message received from the private IP terminal, to store first RTP port information; and
        allocating a second MGI channel and a second RTP port of the second MGI channel, according to a second call setup message having the first allocated RTP port, to store second RTP port information;
    mapping between ports of the at least one channel; and
    redirecting the multimedia data, without conversion to pulse-code modulated data, between the private IP terminal and the public IP terminal, according to the mapped ports, wherein the mapping and the redirecting comprises:
        mapping between the first RTP port and the second RTP port to redirect the multimedia data, without conversion to pulse-code modulated data, between the private IP terminal and the public IP terminal, having the public IP address, according to a call connect message received from the public IP terminal,
    wherein the first call setup message comprises information about at least one of an IP address of the private IP terminal and the first RTP port information.

14. The method of claim 13, wherein the first RTP port information comprises information about at least one of a voice port and a video port of the private IP terminal and a voice port and a video port of the first MGI channel, and the second RTP port information comprises information about at least one of a voice port and a video port of the public IP terminal and a voice port and a video port of the second MGI channel.

15. The method of claim 14, wherein the redirecting comprises:
    receiving voice data from the voice port of the private IP terminal, via the voice port of the first MGI channel; and
    redirecting, without conversion, the voice data to the voice port of the public IP terminal.

16. The method of claim 14, wherein the redirecting comprises:
    receiving video data from the video port of the private IP terminal, via the video port of the first MGI channel; and
    redirecting, without conversion, the video data to the video port of the public IP terminal.

17. The method of claim 14, wherein the redirecting comprises:
    receiving voice data from the voice port of the public IP terminal, via the voice port of the second MGI channel; and
    redirecting, without conversion, the voice data to the voice port of the private IP terminal.

18. The method of claim 14, wherein the redirecting comprises:
    receiving video data from the video port of the public IP terminal, via the video port of the second MGI channel; and
    redirecting, without conversion, the video data to the video port of the private IP terminal.

* * * * *